United States Patent
Onda et al.

(10) Patent No.: US 10,095,039 B2
(45) Date of Patent: Oct. 9, 2018

(54) HEAD-UP DISPLAY AND PROGRAM PRODUCT

(71) Applicant: DENSO CORPORATION, Kariya, Aichi-pref. (JP)

(72) Inventors: Kazuhisa Onda, Kariya (JP); Hiroshi Ando, Kariya (JP); Makoto Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 20 days.

(21) Appl. No.: 14/899,508

(22) PCT Filed: Jun. 24, 2014

(86) PCT No.: PCT/JP2014/003377
§ 371 (c)(1),
(2) Date: Dec. 17, 2015

(87) PCT Pub. No.: WO2014/208081
PCT Pub. Date: Dec. 31, 2014

(65) Prior Publication Data
US 2016/0147073 A1 May 26, 2016

(30) Foreign Application Priority Data

Jun. 28, 2013 (JP) .................. 2013-136660

(51) Int. Cl.
*G02B 27/01* (2006.01)
*B60R 1/00* (2006.01)
*G08G 1/16* (2006.01)

(52) U.S. Cl.
CPC ............ *G02B 27/0179* (2013.01); *B60R 1/00* (2013.01); *G02B 27/01* (2013.01);
(Continued)

(58) Field of Classification Search
CPC ...... G02B 2027/0138; G02B 2027/014; G02B 27/017; G02B 27/01; G02B 27/0179;
(Continued)

(56) References Cited

U.S. PATENT DOCUMENTS

| 2003/0122930 A1* | 7/2003 | Schofield | B60R 1/00 348/148 |
| 2003/0128436 A1* | 7/2003 | Ishii | G02B 27/01 359/630 |

(Continued)

FOREIGN PATENT DOCUMENTS

| JP | 2005-107917 A | 4/2005 |
| JP | 2007-050757 A | 3/2007 |

(Continued)

OTHER PUBLICATIONS

International Search Report and Written Opinion dated Sep. 30, 2014 for the International Application No. PCT/JP2014/003377.

*Primary Examiner* — Sanjiv D Patel
(74) *Attorney, Agent, or Firm* — Knobbe, Martens, Olson & Bear, LLP (57) ABSTRACT

A head-up display includes a display unit displaying images in a display region defined on a vehicle windshield, a vehicle information acquisition unit acquiring vehicle information, a forward view information acquisition unit acquiring forward view information, a display object detection unit detecting a display object for which guidance information is required to be displayed in the display region, a display control unit, and a display form setting unit. The display control unit generates a guidance image indicating the guidance information of the detected display object and displays the generated guidance image over the display object in superimposed manner on the windshield. The display form setting unit calculates an annoyance value indicative of an annoyance level felt by a vehicle occupant when displaying the guid-
(Continued)

ance image in superimposed manner, and sets a display form of the guidance image so that the calculated annoyance value is within a predetermined appropriate range.

7 Claims, 8 Drawing Sheets

(52) U.S. Cl.
CPC ......... *G02B 27/0101* (2013.01); *G08G 1/166* (2013.01); *B60K 2350/962* (2013.01); *B60R 2300/205* (2013.01); *B60R 2300/308* (2013.01); *G02B 2027/014* (2013.01); *G02B 2027/0138* (2013.01); *G02B 2027/0141* (2013.01); *G02B 2027/0183* (2013.01); *G02B 2027/0187* (2013.01); *G09G 2380/10* (2013.01)

(58) Field of Classification Search
CPC .... G02B 2027/0118; G02B 2027/0141; G02B 23/14; G02B 27/32; G02B 2027/0183; B60R 2300/205; B60R 2300/107; B60R 2300/308; B60R 2300/207; G01C 21/3647; G01C 21/365
See application file for complete search history.

(56) References Cited

U.S. PATENT DOCUMENTS

| | | | |
|---|---|---|---|
| 2003/0220835 A1* | 11/2003 | Barnes, Jr. | G06Q 10/1053 705/14.36 |
| 2004/0193331 A1* | 9/2004 | Kashiwada | G02B 27/01 701/1 |
| 2005/0219057 A1* | 10/2005 | Ihara | G08B 21/06 340/575 |
| 2005/0278113 A1 | 12/2005 | Maruyama et al. | |
| 2006/0022808 A1* | 2/2006 | Ito | B60R 1/00 340/425.5 |
| 2006/0086022 A1* | 4/2006 | Would | G06F 3/0482 40/584 |
| 2007/0106475 A1 | 5/2007 | Kondoh | |
| 2008/0204208 A1* | 8/2008 | Kawamata | B60R 1/00 340/435 |
| 2012/0072097 A1* | 3/2012 | Ohta | B60R 1/00 701/118 |
| 2013/0300587 A1* | 11/2013 | Wyatt | G01C 23/00 340/972 |

FOREIGN PATENT DOCUMENTS

| | | |
|---|---|---|
| JP | 2011-119917 A | 6/2011 |
| WO | 2014/208081 A1 | 12/2014 |

* cited by examiner

FIG. 7A
WHEN VEHICLE TRAVELS AT LOW SPEED
(INTERVAL BETWEEN LINES IS NARROW)

NON-SUPERIMPOSED DISPLAY REGION

FIG. 7B
WHEN VEHICLE TRAVELS AT HIGH SPEED
(INTERVAL BETWEEN LINES IS WIDE)

NON-SUPERIMPOSED DISPLAY REGION

HEAD-UP DISPLAY AND PROGRAM PRODUCT

CROSS REFERENCE TO RELATED APPLICATION

This application is based on Japanese Patent Application No. 2013-136660 filed on Jun. 28, 2013, the disclosure of which is incorporated herein by reference.

TECHNICAL FIELD

The present disclosure relates to a head-up display and a program product for displaying information on a windshield of a vehicle.

BACKGROUND ART

Conventionally, there is proposed a vehicular driving support system that includes a display unit with a horizontally-oriented display screen installed under a windshield; the display unit displays, on the display screen, a display object (specifically, a direction in which the display object exists) that is located in front of the vehicle (see, for example, Patent Literature 1).

The above-described system estimates, with reference to a viewpoint of a driver, a direction in which the display object actually exists, based on a positional relationship between the subject vehicle to which the head-up display is equipped and the display object. Then, the above-described system sets an on-screen position that overlaps with the estimated direction as a display position of the display object.

When the above-described technology is applied to a head-up display (hereinafter also simply referred to as a "HUD") that displays information on a windshield of the vehicle, a display in which a predetermined guidance image (figure or the like indicative of the display object) is superimposed on the display position of the display object can be performed to the driver.

The guidance image is displayed in such a way as to be superimposed over the display object in the head-up display, and a forward view display (the display object) changes at a high speed when the vehicle travels at a high speed or travels a sharp turn. In this case, the guidance image moves corresponding to the change of the forward view in a follow-up manner. When the forward view display changes at a high speed, the display of the guidance image might disturb the driving or become annoying to the driver.

Regarding the above-described difficulty, Patent Literature 1 has disclosed a technical solution in which update of the display is halted or an update cycle is changed when the movement of a vehicle is intense (i.e., when the forward view of the vehicle changes at a high speed) to reduce the annoyance to the driver.

However, in a head-up display which displays the guidance image by superimposing the guidance image over the display object viewable by the driver, even when the above-described countermeasures are implemented, the annoyance felt by the driver cannot be removed completely.

In the above-described proposed technology, when the movement (or the operation state) of a vehicle becomes intense, the update of the guidance image is halted or the updating cycle is extended. In this case, the guidance images are displayed in a discrete manner. As a result, the guidance images may be significantly displaced from the actual position of the display object, and this may cause an annoyance of the driver.

PRIOR ART LITERATURES

Patent Literature

[Patent Literature 1] JP 2006-23277 A

SUMMARY OF INVENTION

In view of the foregoing difficulties, it is an object of the present disclosure to provide a head-up display and a program product each of which is for displaying a predetermined guidance image by superimposing the predetermined guidance image on a display object viewable from an inside of the vehicle without making a driver feel annoyed when a movement of the vehicle becomes intense and the intense movement causes a forward view to change at a high speed.

According to an aspect of the present disclosure, a head-up display includes a display unit, a vehicle information acquisition unit, a forward view information acquisition unit, a display object detection unit, a display control unit, and a display form setting unit. The display unit displays an image in a display region defined on a windshield of a vehicle. The vehicle information acquisition unit acquires a vehicle information indicative of an operation state of the vehicle. The forward view information acquisition unit acquires a forward view information indicative of a forward view of the vehicle in a traveling direction. The display object detection unit detects, based on the forward view information and the vehicle information, a display object for which a guidance information is required to be displayed in the display region defined on the windshield. The display control unit generates a guidance image to be displayed on the windshield so that the guidance image indicates the guidance information of the display object detected by the display object detection unit and is superimposed over the display object when seen from an inside portion of a compartment of the vehicle. Then, the display control unit displays the generated guidance image on the windshield using the display unit so that the guidance image is superimposed over the display object. The display form setting unit calculates, based on the vehicle information, or based on both the vehicle information and the forward view information, an annoyance value indicative of an annoyance level felt by an occupant of the vehicle when the guidance image is displayed on the windshield in a superimposed manner. Then, the display form setting unit sets a display form of the guidance image generated by the display control unit under a condition that the calculated annoyance value is within a predetermined appropriate range.

With the above-described head-up display, when the predetermined guidance image is superimposed over the display object viewable from the inside of the vehicle compartment, an annoyance felt by the driver can be restricted when the movement of the vehicle becomes intense and causes the forward view to change at a high speed.

According to another aspect of the present disclosure, a program product stored in a non-transitory computer readable storage medium includes instructions to be executed by a computer. The instructions are for implementing acquiring a vehicle information indicative of an operation state of a vehicle; acquiring a forward view information indicative of a forward view of the vehicle in a traveling direction; detecting, based on the forward view information and the vehicle information, a display object for which a guidance information is required to be displayed in a display region defined on a windshield of the vehicle; generating a guidance image to be displayed in the display region defined on the windshield of the vehicle so that the guidance image indicates the guidance information of the display object and is superimposed over the detected display object when seen from an inside portion of a compartment of the vehicle and displaying the generated guidance image on the windshield so that the guidance image is superimposed over the display object; and calculating, based on the vehicle information, or based on both the vehicle information and the forward view information, an annoyance value indicative of an annoyance level felt by an occupant of the vehicle when the guidance image is displayed on the windshield in a superimposed manner, and setting a display form of the guidance image under a condition that the calculated annoyance value is within a predetermined appropriate range.

With the above-described program product, when the predetermined guidance image is superimposed over the display object viewable from the inside of the vehicle compartment, an annoyance felt by the driver can be restricted when the movement of the vehicle becomes intense and causes the forward view to change at a high speed.

BRIEF DESCRIPTION OF DRAWINGS

The above-described and other objects, features and advantages of the present disclosure will become more apparent from the following detailed description made with reference to the accompanying drawings. In the drawings.

EMBODIMENTS FOR CARRYING OUT INVENTION

The following will describe embodiments of the present disclosure with reference to the accompanying drawings.

The present disclosure is not limited by the embodiments described below. The embodiments of the present disclosure also imply any other form configured by omitting a part of the structure described in the embodiments below as long as it can solve the above-described difficulty.

Figure 1:
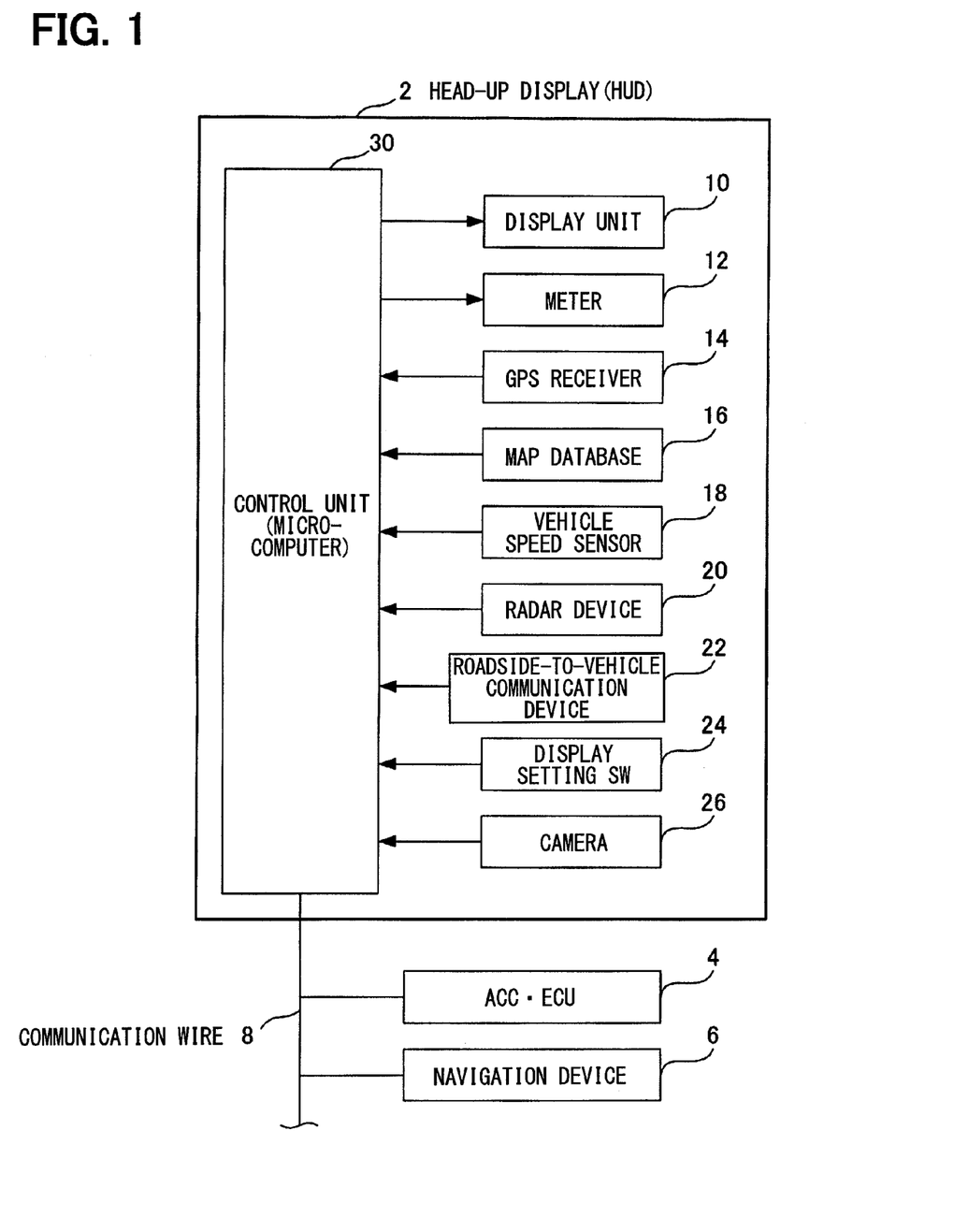
FIG. 1 is a block diagram showing an entire configuration of a head-up display according to an embodiment of the present disclosure.

As shown in FIG. 1, a head-up display (HUD) 2 according to the present embodiment mainly includes a display unit 10 and a control unit 30. The display unit 10 displays a virtual image superimposed on an actual scene in front of a vehicle so that the virtual image is viewable from an inside of the vehicle compartment. The display of the virtual image is performed by irradiating lights for image display purpose to a windshield of the vehicle. The control unit 30 controls the display unit 10.

The control unit 30 includes a microcomputer, which has a CPU, a ROM, a RAM and the like. The control unit 30 generates various kinds of guidance images and controls the display unit 10 to display the guidance image (virtual image) on the windshield.

In order to acquire various types of information required for a generation of the guidance image, the control unit 30 is connected to a meter 12, a GPS receiver 14, a map database 16, a vehicle speed sensor 18, a radar device 20, a roadside-to-vehicle communication device 22, a display setting switch (SW) 24, a camera 26, and the like.

The control unit 30 is connected to vehicle-mounted devices, which include an auto cruise control-electronic control unit (ACC-ECU) 4 and a navigation device 6, via a communication wire 8 that configures an in-vehicle LAN. The control unit 30 is able to acquire information from other vehicle-mounted devices by communicating with the above-described vehicle-mounted devices connected to the control unit 30.

The meter 12 may be provided by a color display device having a display screen, such as a liquid crystal display. The meter 12 may be attached to an instrument panel in front of the driver's seat and displays various states of the vehicle. The control unit 30 controls the meter 12 to display the operation state of the HUD 2, and acquires necessary vehicle state from the meter 12 as needed.

The GPS receiver 14 receives radio waves transmitted from satellites for GPS and detects a position, speed, and acceleration of the vehicle. The control unit 30 acquires the information related to the vehicle from the GPS receiver 14.

The map database 16 stores map data (node data, link data, cost data, road data, terrain data, mark data, intersection data, stop point data, facility data, etc.). The map data stored in the database is used by and supplied to the control unit 30.

The vehicle speed sensor 18 is equipped to a wheel or a propeller shaft. The vehicle speed sensor 18 generates a pulse signal according to a rotation of the attached object and detects a traveling speed of the subject vehicle (subject vehicle speed) based on a time interval in the pulse signal.

The radar device 20 transmits radar waves toward a front direction of the vehicle and receives reflected radar waves. The radar device 20 detects a distance to a vehicle (preceding vehicle) travelling ahead and a relative speed of the subject vehicle with respect to the preceding vehicle.

The roadside-to-vehicle communication device 22 wirelessly communicates with a roadside device installed near a traveling road of the vehicle. The roadside-to-vehicle communication device 22 acquires, from the roadside device, road traffic information (traffic congestion information and traffic regulation information about roads and the like).

The display setting switch SW 24 sets the display modes and the like for the HUD 2. Herein, the display mode includes various types of guidance images to be displayed on the windshield of the vehicle by the display unit 10. The display setting switch SW 24 is provided by a switch and the like to be operated by a user.

The camera 26 takes an image (forward view image) of a forward view in the traveling direction of the vehicle. The control unit 30 uses the image taken by the camera 26 to detect the display object on which the guidance image is to be superimposed.

The ACC-ECU 4 is an electronic control unit that performs an auto cruise control (ACC). The navigation device 6 displays a road map on a display screen disposed in front of the driver's seat and performs a route guidance for a route to be traveled by the vehicle.

The above-described components are similar to those in a related art. The present embodiment is characterized by the procedure in which the control unit 30 controls the display unit 10 to display the guidance image by superimposing the guidance image on the windshield. Thus, a detailed description of the above-described components will be omitted. The following will describe a display control process to be executed by the control unit 30.

The display control process is achieved by an execution of a program stored in a storage medium, such as the ROM, by the microcomputer included in the control unit 30.

Figure 2:
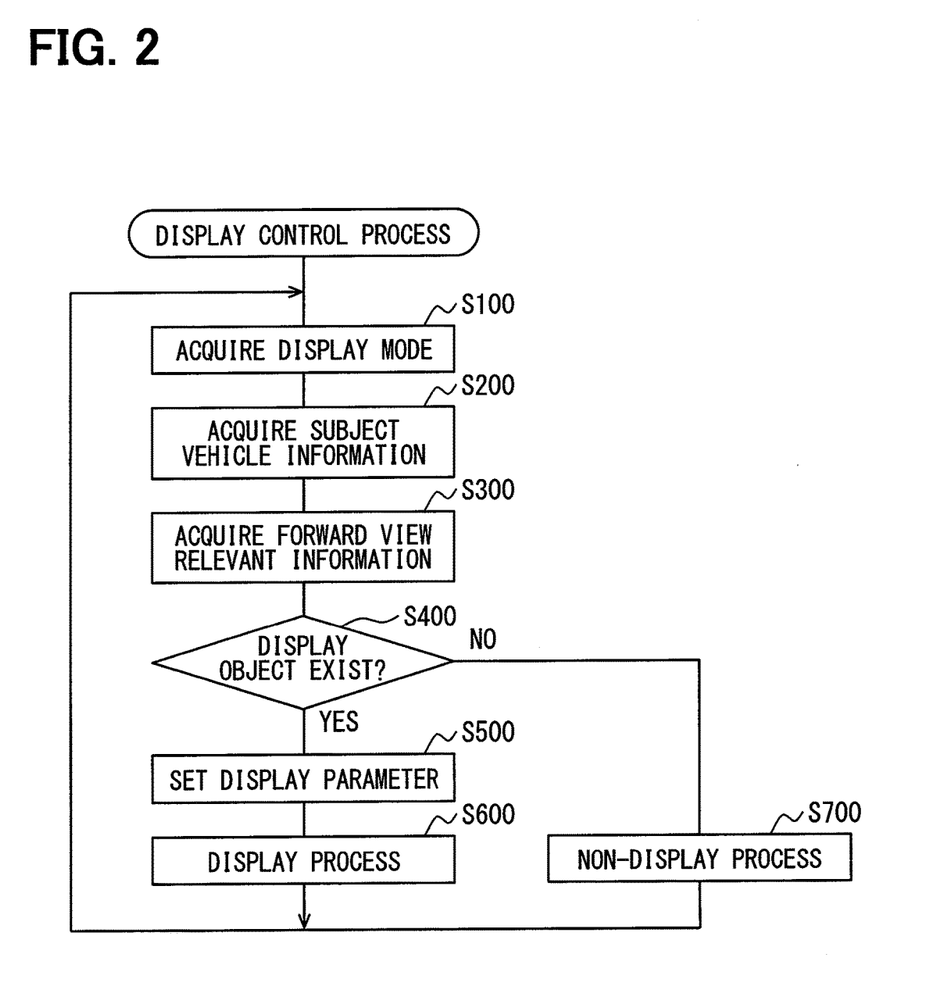
FIG. 2 is a flowchart showing a display control process executed by a control unit.

As shown in FIG. 2, when the control unit 30 starts the display control process, in S100 (S indicating a step), the control unit 30 acquires a start-up state of the vehicle-mounted device connected via the communication wire 8 and acquires an operation mode of the HUD 2 which is set by the display setting switch SW 24.

For example, in S100, the control unit 30 acquires setting information such as ON/OFF state of a route guidance in the navigation device 6, ON/OFF state of the ACC-ECU 4, ON/OFF state of a speed limit sign, ON/OFF state of a traffic signal warning sign, and ON/OFF state of a road surface line display. As a result, the control unit 30 can specify a type of the display object on which a guidance image is to be superimposed on the windshield.

In S200, the control unit 30 executes a subject vehicle information acquisition process and acquires an operation state of the subject vehicle and a surrounding state of the subject vehicle. In the following S300, the control unit 30 executes a forward view information acquisition process and acquires forward view information related to a state of the road ahead of the subject vehicle, a preceding vehicle, and the like.

In the following S400, the control unit 30 determines whether a display object exists based on the information acquired in S100 to S300. Herein, a guidance image is generated corresponding to the display object and the guidance image is displayed on the windshield by superimposing over the display object. The display object may include, for example, a road surface, a traffic signal, a road sign, an advertisement, a preceding vehicle, and a pedestrian.

When determining an existence of the display object in S400, the control unit 30 proceeds to S500. In S500, the control unit 30 sets display parameters corresponding to the display object. Herein, the display parameters include a type of the guidance image, a display position, and a display method.

The process in S500 is executed corresponding to the type of the display object. When there are multiple display objects, the process in S500 is performed for each display object. The display parameter is set on the basis of a movement speed of a forward view of the subject vehicle so that the driver does not feel annoyance to the guidance image.

In S600, the control unit 30 generates a guidance image for display purpose based on the display parameter set in the display parameter setting process of S500. After generating the guidance image, the control unit 30 outputs the guidance image to the display unit 10. Then, the control unit 30 controls the display unit 10 to perform a display process to display the guidance image (in detail, in a form of a graphic corresponding to the display object). In the display process, the guidance image is superimposed over the position of the display object on the windshield when viewed from a line of sight of a driver. Then, the operation returns to S100.

When determining that no display object exists in S400, the control unit 30 proceeds to S700. In S700, the control unit 30 controls the display unit 10 to perform a non-display process to hide the guidance image currently being displayed, and then the operation returns to S100.

In the non-display process of S800, the control unit 30 reduces a brightness of the guidance image at a given time constant for gradually erasing the display in order to avoid instantly erase the guidance image (in other words, not to make the driver feel uncomfortable due to the drastic change in brightness).

Figure 3:
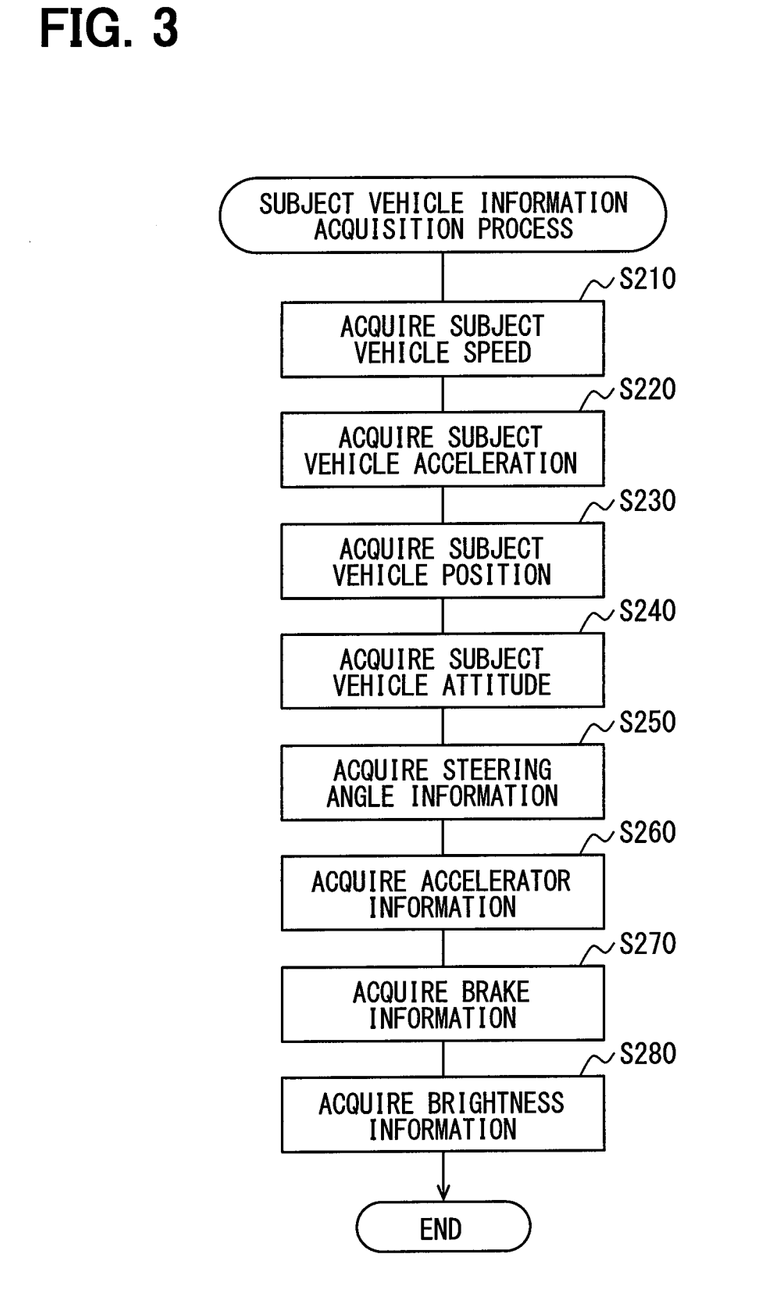
FIG. 3 is a flowchart showing a subject vehicle information acquisition process shown in FIG. 2.

The following will describe the subject vehicle information acquisition process executed in S200 with reference to an exemplary process shown in FIG. 3.

When the subject vehicle information acquisition process starts, first in S210, the control unit 30 acquires the speed of the subject vehicle, which is detected by the vehicle speed sensor 18, the GPS receiver 14, and the like. The subject vehicle speed may be acquired by integrating an acceleration detected by an acceleration sensor (not shown), or may be acquired from the GPS receiver 14. As another example, the subject vehicle speed may also be acquired, via the communication wire 8, from any other vehicle-mounted device having a speed detecting function.

In S220, the control unit 30 acquires an acceleration of the vehicle (subject vehicle acceleration) from an acceleration sensor (not shown), the GPS receiver 14, or any other vehicle-mounted device connected via the communication wire 8.

In S230, the control unit 30 acquires position coordinates of the vehicle (subject vehicle position) from the GPS receiver 14, an inertial navigation system (not shown), the navigation device 6 connected via the communication wire 8, and the like.

In S240, the control unit 30 acquires information related to an attitude of the vehicle (angular velocity around X, Y, and Z axes, an angular acceleration, and an azimuth of each axis) from a gyro sensor (not shown) equipped to the vehicle or from any other vehicle-mounted device connected via the communication wire 8.

In S250, the control unit 30 acquires a steering angle of the vehicle from a steering angle sensor (not shown) attached to a steering column or a steering linkage, or from any other vehicle-mounted device connected via the communication wire 8.

In S260, the control unit 30 acquires a brake pressure of the vehicle (in other words, braking force) from a pressure sensor (not shown) equipped to a brake hydraulic system or from any other vehicle-mounted device (ABS-ECU and the like) connected via the communication wire 8.

In S270, the control unit 30 acquires an opening degree of a throttle valve (throttle position) from a throttle position sensor (not shown) equipped to an engine of the vehicle or from any other vehicle-mounted device (engine ECU or the like) connected via the communication wire 8.

In S280, the control unit 30 acquires an external illuminance (external illuminance) of an outside environment of the vehicle from an illuminance sensor (not shown) equipped to the vehicle or from any other vehicle-mounted device (e.g., air conditioner ECU and the like) connected via the communication wire 8.

As described above, in the subject vehicle information acquisition process, the control unit 30 acquires information related to the subject vehicle. Herein, the information related to the subject vehicle includes the subject vehicle speed, the subject vehicle acceleration, the subject vehicle position, the subject vehicle attitude, the steering angle, the brake pressure, the throttle position, and the external illuminance. In the subject vehicle information acquisition process, the order of S210 to S280 may be changed. A part of processes in S210 to S280 may be omitted depending on the operation mode of the HUD 2.

Figure 4:
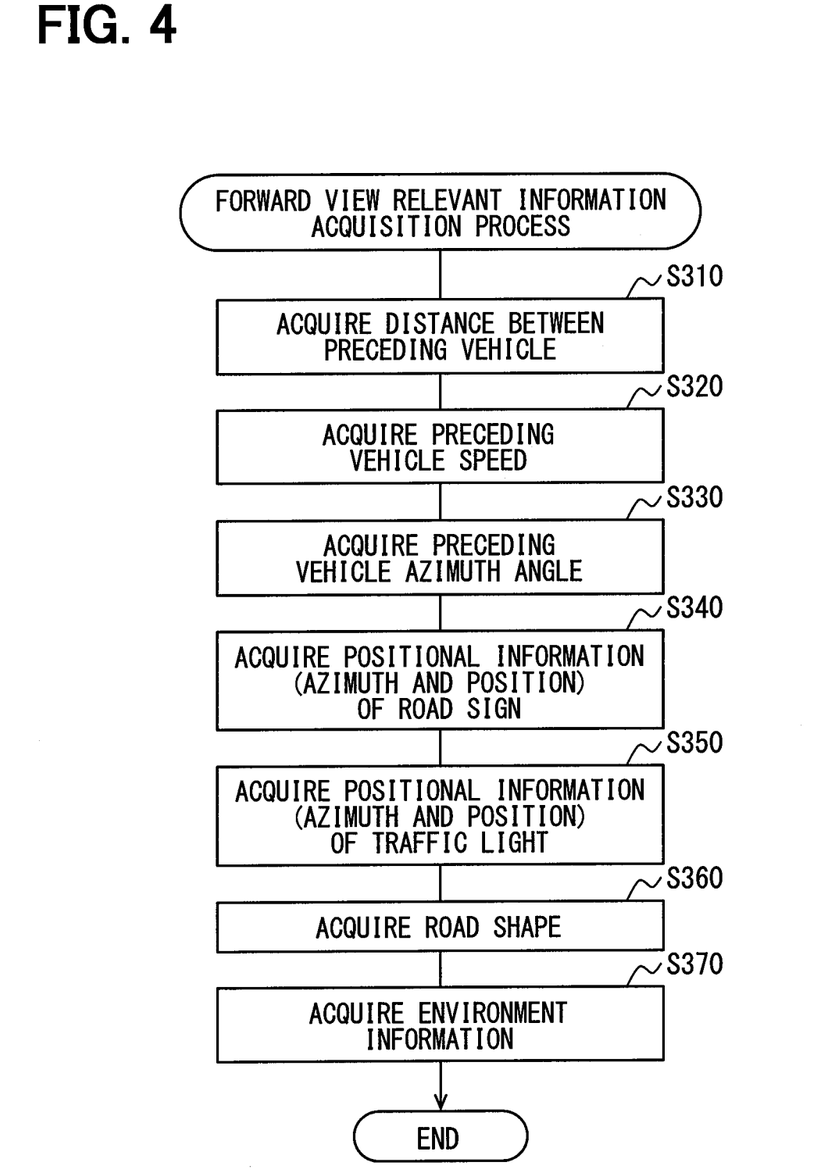
FIG. 4 is a flowchart showing a forward view information acquisition process shown in FIG. 2.

The following will describe the forward view information acquisition process executed in S300 with reference to an exemplary process shown in FIG. 4.

When the forward view information acquisition process starts, first in S310, the control unit 30 acquires a distance from the subject vehicle to the preceding vehicle from the radar device 20. In the following S320, the control unit 30 acquires a speed of the preceding vehicle from the radar device 20. In S330, the control unit 30 acquires an azimuth angle of the preceding vehicle viewed from the subject vehicle from the radar device 20.

The above-described information acquired in S310 to S330 may also be acquired, via the communication wire 8, from any other vehicle-mounted device having similar functions with the radar device 20.

In S340, the control unit 30 acquires position information (azimuth, position, etc.,) related to road signs being exist in front of the subject vehicle based on an image process result of the images taken by the camera 26, the subject vehicle position information acquired in S230, the map data stored in the map database 16, and the like.

In S350, the control unit 30 acquires position information (azimuth, position, etc.,) related to traffic lights being exist in front of the subject vehicle based on the image process result of the images taken by the camera 26, the subject vehicle position information acquired in S230, the map data stored in the map database 16, and the like.

In S360, the control unit 30 acquires shapes of roads (in detail, shapes of a travelling road, a side road, a guard rail, etc.,) in front of the subject vehicle based on the image process result of the images taken by the camera 26, the subject vehicle position information acquired in S230, the map data stored in the map database 16, and the like.

When acquiring the position information about the road signs and traffic lights as well as the shapes of roads in the processes S340 to S360, the head-up display may use the navigation device 6 connected via the communication wire 8 or may use a server, which is included in a network disposed outside of the vehicle and is accessible via various kinds of wireless communication.

In S370, the control unit 30 acquires environmental information related to the surrounding of the vehicle. Herein, the information related to the surrounding of the vehicle includes congestion information of roads around the vehicle and meteorological information (weather, temperature, etc.,) related to the surrounding of the vehicle from the server, which is included in a network disposed outside of the vehicle and is accessible via various kinds of wireless communication.

As described above, in the forward view information acquisition process, the control unit 30 acquires the distance to the preceding vehicle, the speed of the preceding vehicle, the azimuth angle of the preceding vehicle, the position information related to the road signs, the position information related to the traffic lights, the shapes of the roads in front of the subject vehicle, and the environmental information related to the surrounding of the vehicle. In the forward view information acquisition process, the order of S310 to S370 may be changed. A part of processes in S310 to S370 may be omitted depending on the operation mode of the HUD 2.

Figure 5:
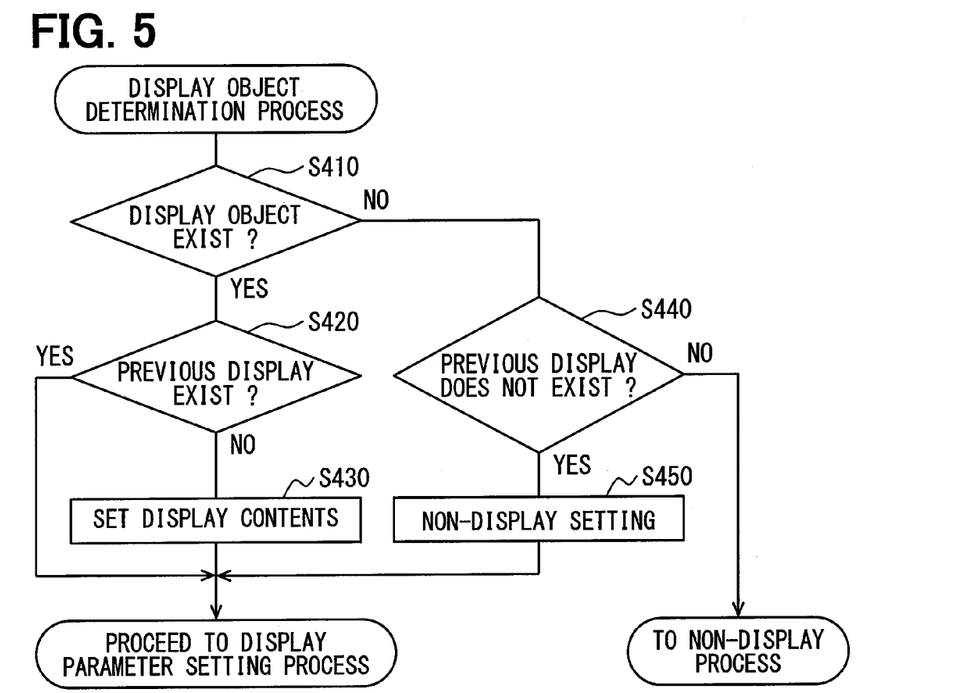
FIG. 5 is a flowchart showing a display object determination process shown in FIG. 2.

The following will describe the display object determination process executed in S400 with reference to an exemplary process shown in FIG. 5.

First, in S410, the control unit 30 determines whether the display object exists or not, based on the information acquired in S100 to S300 and information set by the driver.

When determining an existence of the display object in S410, the control unit 30 proceeds to S420. In S420, the control unit 30 determines whether or not the display object has been already set as a display content for displaying the guidance image (that is, whether the guide image is being currently displayed or not).

When determining that the display object being currently displayed in S420, the control unit 30 ends the display object determination process. Then, the control unit 30 proceeds to the display parameter setting process of S500. When determining that the display object being not currently displayed in S420, (that is, the display of the guidance image superimposed over the display object is scheduled to start), the control unit 30 proceeds to S430.

In S430, the control unit 30 sets the display object as the display content, and includes information, which indicates that a display start process is required, in the display content. Then, the control unit 30 ends the display object determination process, and proceeds to the display parameter setting process in S500.

When determining non-existence of the display object in S410, the control unit 30 proceeds to S440. In S440, the control unit 30 determines whether or not there is a display object set as the display content (specifically, determines an existence of a display object for which the guidance image being currently displayed).

When the control unit 30 determines non-existence of a display object for which the guidance image being currently displayed in S440, the control unit 30 ends the display object determination process and proceeds to the non-display process in S700. When the control unit 30 determines that a display object for which the guidance image being currently displayed exists in S440 (that is, when the display of the guidance image superimposed over the display object needs to be ended), the operation proceeds to S450.

In S450, the control unit 30 sets the display object for which the guidance image being currently displayed as a non-display content, and includes information, which indicates that a display end process is required, in the non-display content. Then, the control unit 30 ends the display object determination process, and proceeds to the display parameter setting process in S500.

Figure 6:
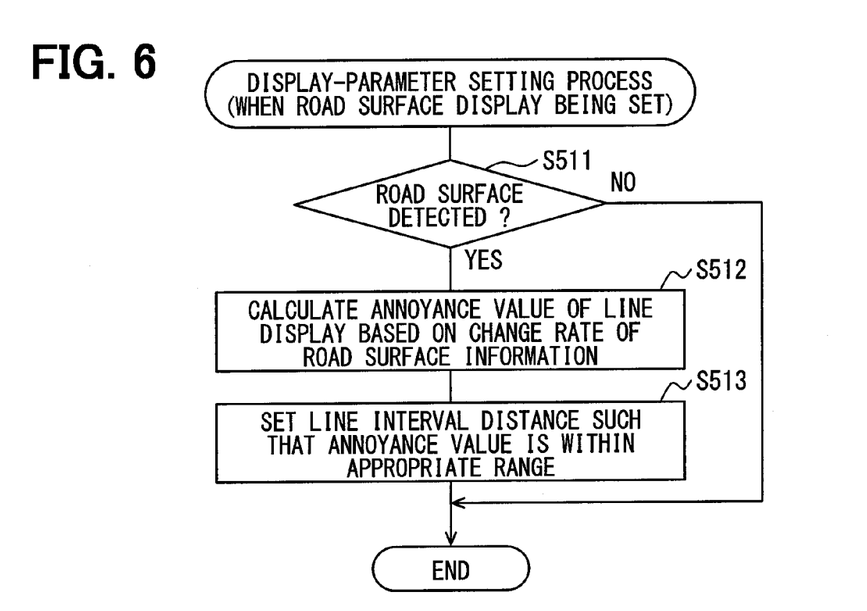
FIG. 6 is a flowchart showing a display parameter setting process executed during a road surface display mode.

FIG. 6 illustrates the display parameter setting process executed in S500 when a road surface is selected as the display object and lines indicative of distances from the subject vehicle to respective points on the road surface need to be displayed as the guidance image.

As shown in FIG. 6, when the display parameter setting process starts in the road surface display mode, first in S511, the control unit 30 determines whether or not the road surface, which is the display object, is detected as the display content. As described above, this determination over the display object is carried out in the determination process of S400.

When determining that the road surface is not detected as the display content, the control unit ends the display parameter setting process. When determining that the road surface is detected as the display content, the control unit 30 proceeds to S512.

In S512, the control unit 30 calculates an annoyance value indicative of an annoyance level felt by the driver due to a superimposed display of lines on the road surface.

In S512, the control unit 30 selects road surface information (travelling state of the subject vehicle, road shape, road traffic information, etc.) from the information acquired in the subject vehicle information acquisition process of S200 and from the information acquired in the forward view information acquisition process of S300. Herein, the road surface information is previously set to estimate the annoyance level of the driver caused by a display of the lines on the road surface.

The control unit 30 calculates a changing rate of the selected road surface information and estimates a change of scenes (in a form of estimated optical flow) including the road surface and a surrounding of the road surface. Then, the control unit 30 calculates an annoyance level felt by the driver (or annoyance value) due to a display of the lines on the road surface from the calculated changing rate of the road surface information (in other words, an estimated change of scene).

Specifically, the control unit 30 acquires road surface information A at time T1, and acquires road surface information B at time T2. Then, the control unit 30 extracts a feature point from both the acquired road surface information A and the acquired road surface information B. Then, the control unit 30 calculates a moving distance L between the two feature points in respective information. Further, the feature point moving distance L is divided by a time difference ΔT between the time T1 and the time T2, thus calculating the feature point moving distance ΔL per unit time. Further, the annoyance W of a picture felt by a person is previously identified by a function W=F (ΔL) of the picture change (feature point moving distance ΔL) and is stored in the control unit 30. Based on the acquired feature point moving amount ΔL, the annoyance value W is calculated with reference to the function stored in the control unit 30.

When the annoyance value related to the display of lines on the road surface is calculated in S512, the control unit 30 proceeds to S513. In S513, based on the calculated annoyance value, the control unit 30 calculates a target changing rate of the guidance image (in this case, the lines displayed on the road surface) under which the annoyance value becomes to a value within an appropriate range equal to or lower than a predetermined threshold value. Then, the control unit 30 determines an interval between the displayed lines superimposed on the road surface on the basis of the target changing rate of the guidance image.

Figure 7A:
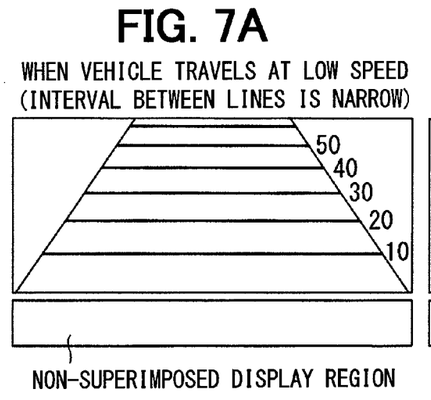
FIG. 7A is a diagram illustrating a guidance image of lines in a road surface display mode when a vehicle travels at a low speed.
Figure 7B:
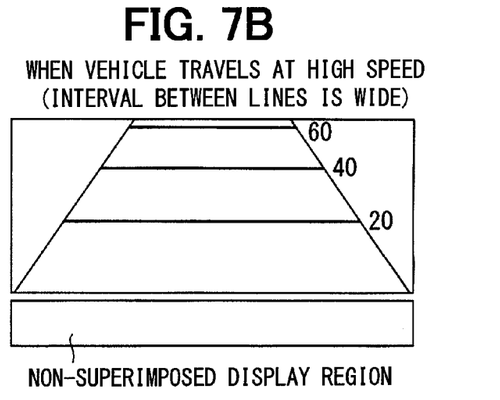
FIG. 7B is a diagram illustrating another guidance image of lines in a road surface display mode when a vehicle travels at a high speed.

As a result, for example, as shown in FIG. 7A, when the vehicle travels at a low speed, the interval between the lines superimposed on the display of the road surface becomes narrow. On the other hand, as shown in FIG. 7B, when the vehicle travels at a higher speed, the interval between the lines superimposed on the display of the road surface becomes wide. This configuration can restrict an annoyance felt by the driver due to a high speed flowing of the narrowly distanced lines during a high speed travelling of the vehicle.

In FIGS. 7A and 7B, on a region of the windshield, a frame shown under a display region (superimposed display region) in which the lines are superimposed on the road surface indicates a non-superimposed display region. In the non-superimposed display region, the superimposed display is prohibited. The non-superimposed display region displays icons and the like indicative of the operation state of the head-up display.

Figure 8:
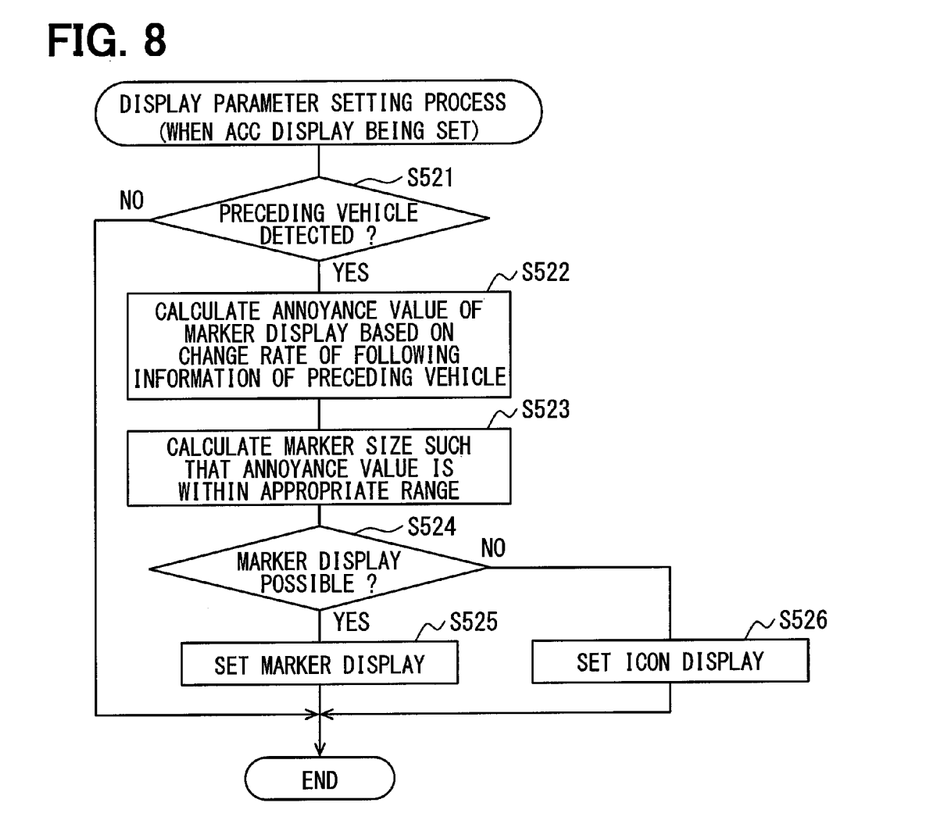
FIG. 8 is a flowchart showing a display parameter setting process executed during an ACC display mode.

FIG. 8 illustrates the display parameter setting process executed in S500 when the preceding vehicle is selected as the display object (ACC display mode being set) corresponding to the ACC control executed by the ACC-ECU 4.

As shown in FIG. 8, in the display parameter setting process corresponding to the ACC display mode, first in S521, the control unit 30 determines whether or not the preceding vehicle, which is set as the display object, is detected as the display content in the display object determination process of S400.

When determining that the preceding vehicle is not detected as the display content, the control unit 30 ends the display parameter setting process. On the other hand, when determining that the preceding vehicle is detected as the display content, the control unit 30 proceeds to S522.

Figure 9A:
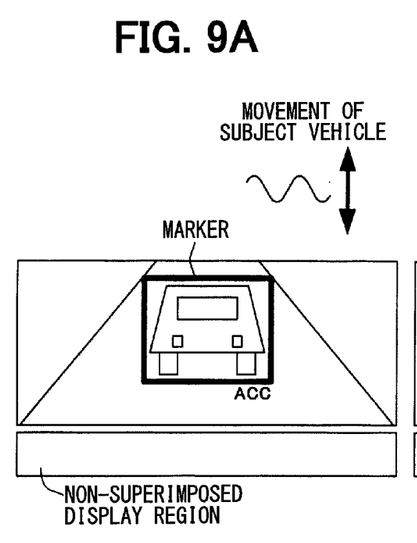
FIG. 9A is a diagram illustrating a guidance image of a marker displayed in an ACC display mode.
Figure 9B:
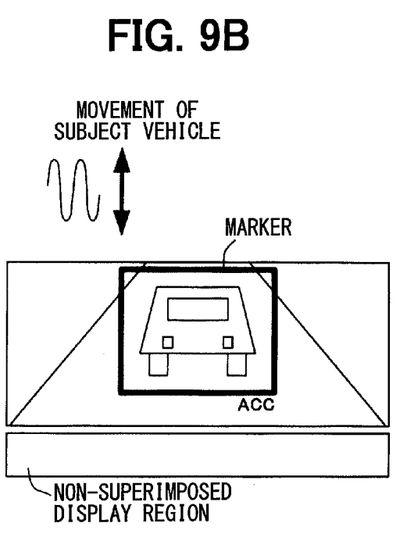
FIG. 9B is a diagram illustrating a guidance image of a marker displayed in an ACC display mode when a vibration of the vehicle becomes more intense than that of FIG. 9A.
Figure 9C:
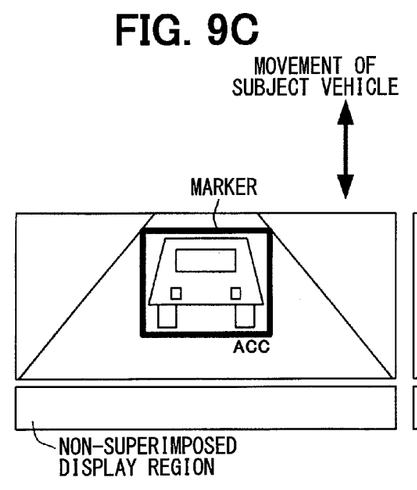
FIG. 9C is a diagram illustrating a guidance image of a marker displayed in an ACC display mode.

In S522, the control unit 30 calculates an annoyance value. The annoyance value indicates the annoyance level felt by the driver caused by the display of the guidance image of the preceding vehicle (in a form of a rectangular marker as illustrated in FIGS. 9A to 9C).

In S522, first, the control unit 30 selects preceding vehicle following information (operation states of the subject vehicle and the preceding vehicle, road shape, road traffic information, etc.) from the information acquired in the subject vehicle information acquisition process of S200 and from the information acquired in the forward view information acquisition process of S300. Herein, the preceding vehicle following information is previously set for estimating the annoyance level felt by the driver due to displaying the preceding vehicle using a marker.

The control unit 30 calculates a changing rate of the selected preceding vehicle following information to estimate a change of forward view including the preceding vehicle. Then, the control unit 30 calculates the annoyance level felt by the driver (or annoyance value) caused by the display of the preceding vehicle using the marker based on the calculated changing rate of the selected preceding vehicle following information (in other words, an estimated change of the forward view).

After calculating the annoyance value caused by the marker display in S522, the control unit 30 proceeds to S523. In S523, based on the calculated annoyance value, the control unit 30 determines a target size (marker size) of a guidance image (combined marker) for controlling the annoyance value within the appropriate range equal to or lower than the predetermined threshold.

In S522, the control unit 30 calculates, for example, a vibration frequency of the preceding vehicle and performs a frequency resolution. Then, the control unit 30 calculates a following frequency that makes the annoyance value of the driver within the appropriate range, which is equal to or lower than the threshold. Subsequently, the control unit 30 calculates a marker size so that the marker does not deviate from the preceding vehicle when displaying the marker under the calculated following frequency.

After calculating the marker size in the above-described manner, the control unit 30 determines whether or not the marker can be displayed in the calculated marker size within the superimposed display region in S524.

When determining that the maker is displayable in the calculated marker size within the superimposed display region in S524, the control unit 300 proceeds to S525. In S525, the control unit 30 displays the marker for the preceding vehicle in the marker size, which is calculated in S523. When determining that the maker cannot be displayed in the calculated marker size within the superimposed display region in S524, the control unit 30 displays an icon for the preceding vehicle in S526.

As a result, for example, as shown in FIG. 9A, when the vibration of the subject vehicle is small, the marker size is set small. As shown in FIG. 9B, when vibration of the subject vehicle is large, the marker size is set larger than case shown in FIG. 9A.

In the above-described configuration, the marker size is increased corresponding to an increase of a vibration intensity of the subject vehicle. This configuration can suppress the movement of the marker with respect to the movement of the preceding vehicle (that is, the relative movement of the preceding vehicle with respect to the subject vehicle) viewable through the windshield while displaying the preceding vehicle using the marker. Thus, the annoyance felt by the driver due to the marker display can be restricted.

Figure 9D:
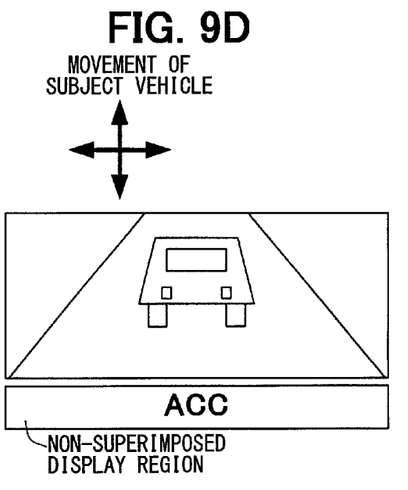
FIG. 9D is a diagram illustrating an image indicative of an icon displayed in an ACC display mode when a movement in a width direction of the vehicle becomes more intense than that of FIG. 9C.

For example, as shown in FIGS. 9C and 9D, when the movement intensity of the subject vehicle in the lateral direction is increased during a travelling of turn and the like, the marker displayed corresponding to the preceding vehicle in the calculated maker size may be deviated from the superimposed display region. In this case, the marker display is switched to an icon display in which an icon indicative of the ACC control mode ("ACC" shown in FIG. 9D) is displayed in the non-superimposed display region. With this configuration, the annoyance felt by the driver due to the marker display can be restricted.

Figure 10:
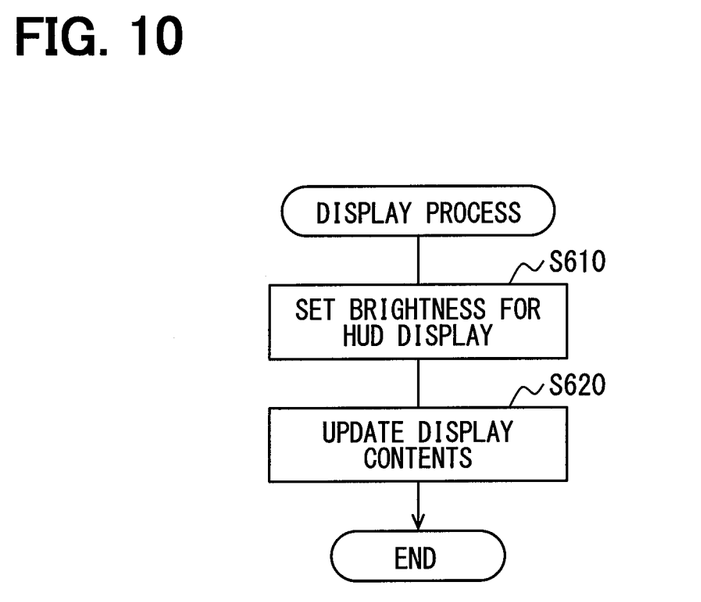
FIG. 10 is a flowchart showing a display process shown in FIG. 2.

In the display process of S600, as shown in FIG. 10, first in S610, the control unit 30 performs a brightness setting for the entire display contents including the above-described guidance images, such as the line and marker, based on information related to the brightness (for example, illuminance of the sunlight entering from outside environment of the vehicle) acquired in the process of S280.

In S610, for the display content that requires the display start process, the control unit 30 gradually increases the brightness at a predetermined time constant. Further, for the display content that requires the display end process, the control unit 30 gradually decreases the brightness at a predetermined time constant.

As a result, the display content is prevented from being appeared suddenly on the windshield, or the display content is prevented from being disappeared suddenly from the windshield. Thus, an annoyance felt by the driver due to the sudden appearance or sudden disappearance of the display content can be restricted.

In the following S620, the control unit 30 generates image data to be displayed on the windshield according to parameters set in the display parameter setting process and the process of S610. Then, the control unit 30 outputs the image data to the display unit 10, and controls the display unit 10 to display various guidance images on the windshield.

As mentioned above, in the head-up display according to the present embodiment, when displaying the guidance image by superimposing the guidance image over the display object, the annoyance value is calculated. Herein, the annoyance value indicates the annoyance level felt by the driver due to the display of the guidance image. Then, the display form including the shape (interval between the lines), size, display position, display contents (icon), etc., of the guidance images are set such that the annoyance value becomes within the appropriate range.

In the present embodiment, with an increase of the annoyance value, the guidance image is displayed in a more easily viewable manner so that the annoyance felt by the driver is reduced without stopping the movement of the guidance image.

Specifically, in the present embodiment, the information indicating the annoyance felt by the driver is selected from the subject vehicle information and the forward view information, and this information is used for calculating the annoyance value felt by the driver. Then, the changing rate of the selected information is determined. With this configuration, the flow of the surrounding scene, which exists around the superimposed guidance image, is estimated. Based on the estimated flow of the surrounding scene, the annoyance value felt by the driver is calculated.

Then, the display form of the guidance image is set in such a manner that the annoyance value calculated in this way becomes within the appropriate range. Thus, the guidance image can be optimally set in accordance with the flow of the surrounding scene during the travelling.

When calculating the annoyance value, the head-up display can utilize not only the subject vehicle information and the forward view information that can be detected by a group of sensors mounted on the subject vehicle, but also the environmental information related to the surroundings of the vehicle (road traffic information, meteorological information, etc.,) that can be acquired from the outside of the vehicle via the roadside-to-vehicle communication device 22 and the like.

For example, during a congestion in which the driver tends to easily feel annoyed, the annoyance value felt by the driver may be increased. Otherwise, on rainy days when the front of the vehicle is difficult to view and the driver is more likely to feel annoyed, the annoyance value may be increased. By increasing the annoyance value in the above-described circumstances, the display form of the guidance image can be set more optimally for the driver.

Although the one embodiment of the present disclosure has been described above, the present disclosure is not limited to the above-described embodiment, and various modifications and changes can be made without departing from the scope and spirit of the present disclosure.

For example, in the above-described embodiment, the display form of the guidance images set on the basis of the calculated annoyance value includes the shape, size, display position, display contents, etc., of the guidance image. For another example, the brightness (luminance) of the guidance image and the movement frequency of the guidance image while the guidance image follows the display object may be set corresponding to the annoyance value, and may be displayed as the display form of the guidance images.

The operation state of the subject vehicle can be estimated based only on the flow of the scene in front of the subject vehicle. Thus, only the subject vehicle information may be used to calculate the annoyance value. For example, when the environmental information related to the surroundings of the subject vehicle cannot be acquired from the outside, the subject vehicle information and the forward view information detectable only by the sensor group mounted on the subject vehicle may be used to calculate the annoyance value.

In the above-described embodiment, the flow of the scene in front of the subject vehicle is estimated for the calculation of the annoyance value. However, the head-up display does not necessarily estimate the flow of the scene. For example, the head-up display may calculate the annoyance value directly based on the subject vehicle information and the like.

In a case where the head-up display calculates the annoyance value directly based on the subject vehicle information, for example, when the vehicle speed is high, the driver tends to easily feel annoyed because of the display of the guidance image. Accordingly, a coefficient for calculating the annoyance value may be set larger corresponding to the increase of the vehicle speed. When a steering angle of the steering wheel is increased while the vehicle makes a turn, the coefficient for calculating the annoyance value may be increased accordingly. In such a procedure, the coefficient is set for each information that represents the operation state of the vehicle. With this configuration, the annoyance value can be calculated based on the coefficient that is adjusted corresponding to the operation state of the vehicle.

The above-described disclosure includes the following embodiments.

According to an aspect of the present disclosure, a head-up display includes a display unit displaying images in a display region defined on a windshield of a vehicle; a vehicle information acquisition unit; a forward view information acquisition unit; a display object detection unit; a display control unit; and a display form setting unit.

The vehicle information acquisition unit acquires vehicle information representing an operation state of the vehicle (subject vehicle). The forward view information acquisition unit acquires forward view information representing a forward view in front of the vehicle (subject vehicle) in a traveling direction. The display object detection unit detects, based on the forward view information and the subject vehicle information, a display object for which the guidance information is required to be displayed in the display region defined on the windshield.

The display control unit generates the guidance image for displaying guidance information superimposed on the windshield such that the guidance information is superimposed over the display object when viewing the display object detected by the display object detection unit from an inside portion of the vehicle compartment. Then, the display control unit displays the guidance image superimposed on the windshield via the display unit. That is, the display control unit displays the guidance image in such a manner that the guidance image is superimposed over the display object when viewing the display object detected by the display object detection unit, from the line of the vision of the driver from the inside portion of the vehicle compartment.

The display-form setting unit calculates the annoyance value indicative of the annoyance level felt by the driver when displaying the guidance image superimposed on the windshield, based on the subject vehicle information, or based on the subject vehicle information and the forward view information. Then, the display-form setting unit sets the display form of the guidance image taken by the display control unit such that the calculated annoyance value is within the predetermined appropriate range.

In the head-up display having the above-described configuration, when the vehicle travels at a high speed or makes a turn, the operation state of the vehicle and the forward view change drastically and this drastic change may increase the annoyance value calculated based on the subject vehicle information or on the subject vehicle information and the forward view information. As a result, the annoyance value may deviate largely from the appropriate range.

In the above-described case, the present disclosure changes the display form of the guidance image (for example, the size, brightness, shape, frequency of movement, display position, etc., of the guidance image) in order to maintain the annoyance value within the appropriate range without stopping the movement of the guidance image.

Thus, the present disclosure can prevent the driver from feeing more annoyed due to the guidance image that is largely deviated from the display object when the annoyance value becomes large.

Further, the present disclosure quantifies the level of annoyance felt by an occupant, such as the driver, as the annoyance value based on the subject vehicle information indicative of the operation state of the vehicle, or based on the subject vehicle information and the forward view information indicative of the forward view in front of the subject vehicle. Further, the display form of the guidance image is set based on the quantified annoyance value.

Thus, the display form of the guidance image can be appropriately set according to the operation state of the vehicle (further, the change in forward view), and this configuration can suppress the annoyance felt by the driver caused by the display of the guidance image.

In the head-up display of the present disclosure, the functions of the vehicle information acquisition unit, the forward view information acquisition unit, the display object detection unit, the display control unit, and the display-form setting unit may be achieved by a program executed by a computer.

In the above-described case, the program may be configured as a program product stored in a storage medium readable by a computer, such as a DVD-ROM, a CD-ROM, or a hard disk. The program may be loaded onto the computer, or may be acquired by the computer using communication lines, as needed. The program is then executed, whereby the computer can function as the above-described respective units of the present disclosure.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. A head-up display comprising:
 a display unit displaying images in a display region defined on a windshield of a vehicle;
 a vehicle information acquisition unit acquiring a vehicle information indicative of an operation state of the vehicle;
 a forward view information acquisition unit acquiring a forward view information indicative of a forward view of the vehicle in a traveling direction;

a display object detection unit detecting, based on the forward view information and the vehicle information, a display object for which a guidance information is required to be displayed in the display region defined on the windshield;

a display control unit generating a guidance image to be displayed on the windshield so that the guidance image indicates the guidance information of the display object detected by the display object detection unit and is superimposed over the display object when seen from an inside portion of a compartment of the vehicle, and the display control unit displaying the generated guidance image on the windshield using the display unit so that the guidance image is superimposed over the display object; and a display form setting unit calculating, based on the vehicle information, or based on both the vehicle information and the forward view information, a changing rate of the forward view and a changing rate of the guidance image when the guidance image is displayed on the windshield in a superimposed manner, wherein each of the changing rate of the forward view and the changing rate of the guidance image is calculated based on a vehicle speed and increases with an increase of the vehicle speed, and the display form setting unit setting a display form of the guidance image generated by the display control unit under a condition that a sum of the changing rate of the forward view and the changing rate of the guidance image is within a predetermined appropriate range.

2. The head-up display according to claim 1, wherein the display form setting unit estimates, based on the vehicle information and the forward view information, a flow of the forward view seen from the inside portion of the compartment of the vehicle, and calculates the sum of the changing rate of the forward view and the changing rate of the guidance image based on the estimated flow of the forward view.

3. The head-up display according to claim 2, wherein the forward view information acquisition unit is capable of acquiring an environmental information indicative of a surrounding environment of the vehicle from an outside source in addition to the forward view information, and the display form setting unit uses the environmental information acquired by the forward view information acquisition unit when calculating the sum of the changing rate of the forward view and the changing rate of the guidance image.

4. The head-up display according to claim 1, wherein the display form setting unit changes at least one of a size, a brightness, a shape, a movement frequency, or a display position of the guidance image depending on the sum of the changing rate of the forward view and the changing rate of the guidance image.

5. The head-up display according to claim 4, wherein the display region used by the display unit for a display purpose includes a non-superimposed display region where a superimposed display over the display object is prohibited, and the display form setting unit is capable of setting the display form of the guidance image so that a simplified image, which is acquired by simplifying the guidance image to be superimposed over the display object, is displayed in the non-superimposed display region.

6. The head-up display according to claim 1, wherein the display form setting unit calculates, based on the vehicle information and the forward view information, the changing rate of the forward view, the forward view is a view seen from the inside portion of the compartment of the vehicle and includes a road surface and a preceding vehicle as the display object.

7. A program product stored in a non-transitory computer readable storage medium, the program product comprising instructions to be executed by a computer, the instructions for implementing:

acquiring a vehicle information indicative of an operation state of a vehicle;

acquiring a forward view information indicative of a forward view of the vehicle in a traveling direction;

detecting, based on the forward view information and the vehicle information, a display object for which a guidance information is required to be displayed in a display region defined on a windshield of the vehicle;

generating a guidance image to be displayed in the display region defined on the windshield of the vehicle so that the guidance image indicates the guidance information of the display object and is superimposed over the detected display object when seen from an inside portion of a compartment of the vehicle and displaying the generated guidance image on the windshield so that the guidance image is superimposed over the display object; and calculating, based on the vehicle information, or based on both the vehicle information and the forward view information, a changing rate of the forward view and a changing rate of the guidance image when the guidance image is displayed on the windshield in a superimposed manner, wherein each of the changing rate of the forward view and the changing rate of the guidance image is calculated based on a vehicle speed and increases with an increase of the vehicle speed, and setting a display form of the guidance image under a condition that a sum of the changing rate of the forward view and the changing rate of the guidance image is within a predetermined appropriate range.

* * * * *